United States Patent
Kitzmann et al.

(10) Patent No.: US 9,399,928 B2
(45) Date of Patent: Jul. 26, 2016

(54) STEAM POWER PLANT WITH HEAT RESERVOIR AND METHOD FOR OPERATING A STEAM POWER PLANT

(71) Applicant: ALSTOM Technology Ltd, Baden (CH)

(72) Inventors: Ewald Kitzmann, Weinheim (DE); Volker Schüle, Leimen (DE); Julia Heintz, Gernsheim (DE); Benjamin Bond, Mannheim (DE)

(73) Assignee: ALSTOM TECHNOLOGY LTD, Baden (CH)

( * ) Notice: Subject to any disclaimer, the term of this patent is extended or adjusted under 35 U.S.C. 154(b) by 0 days.

(21) Appl. No.: 13/668,220

(22) Filed: Nov. 3, 2012

(65) Prior Publication Data

US 2013/0298558 A1  Nov. 14, 2013

(30) Foreign Application Priority Data

Nov. 3, 2011  (EP) .................................. 11187644

(51) Int. Cl.
*F01K 7/40* (2006.01)
*F01K 3/00* (2006.01)
(Continued)

(52) U.S. Cl.
CPC ................. *F01K 3/004* (2013.01); *F01K 3/265* (2013.01); *F01K 7/22* (2013.01); *F01K 7/40* (2013.01); *F01K 13/02* (2013.01); *F22D 3/00* (2013.01); *Y02E 60/142* (2013.01)

(58) Field of Classification Search
CPC ............. F01K 7/40; F01K 7/22; F01K 3/004; F01K 3/265; F01K 3/26; F01K 3/00; F01K 3/14; F01K 3/18; F01K 3/22; F01K 3/262; F01K 7/34; F01K 7/38; F01K 1/08; F01K 7/44; F22D 3/00–3/10; F22D 1/32–1/34

USPC ..................................................... 60/645–681
See application file for complete search history.

(56) References Cited

U.S. PATENT DOCUMENTS 3,979,914 A * 9/1976 Weber ........................... 376/402
4,003,205 A * 1/1977 Matsumura ..................... 60/646
(Continued)

FOREIGN PATENT DOCUMENTS

DE   939449 C  * 2/1956
DE   1128437 B   4/1962
(Continued)

OTHER PUBLICATIONS

Extended European Search Report, European Patent Application No. 11187644, Alstom Technology, Ltd., Apr. 20, 2012.

*Primary Examiner* — Thomas Denion
*Assistant Examiner* — Laert Dounis
(74) *Attorney, Agent, or Firm* — GE Global Patent Operation; Stephen G. Midgley

(57) ABSTRACT

A steam power plant is suggested having, parallel to the low-pressure passage (VW1 to VW2), a heat reservoir (A) which is loaded with preheated condensate in weak-load times. This preheated condensate is taken from the heat reservoir (A) for generating peak-load and inserted downstream of the low-pressure preheater passage (VW1 to VW2) into the condensate line that contacts the feed water container (8). Thus it is possible to quickly control the power generation of the power plant in a wide range without significantly having to change the heating output of the boiler of the steam generator (1). A steam power plant equipped according to the invention can thus be operated with bigger load modifications and also provide more control energy.

21 Claims, 5 Drawing Sheets

(51) Int. Cl.
*F01K 13/02* (2006.01)
*F22D 3/00* (2006.01)
*F01K 3/26* (2006.01)
*F01K 7/22* (2006.01)

(56) References Cited

U.S. PATENT DOCUMENTS

| | | | | |
|---|---|---|---|---|
| 4,003,786 A | * | 1/1977 | Cahn | 376/322 |
| 4,130,992 A | * | 12/1978 | Bitterlich et al. | 60/652 |
| 4,164,848 A | * | 8/1979 | Gilli et al. | 60/652 |
| 4,549,401 A | | 10/1985 | Spliethoff | |
| 5,335,252 A | * | 8/1994 | Kaufman | 376/402 |
| 6,076,355 A | * | 6/2000 | Ven et al. | 60/655 |
| 6,263,662 B1 | * | 7/2001 | Nagashima | 60/39.182 |
| 6,397,575 B2 | * | 6/2002 | Tomlinson et al. | 60/783 |
| 2009/0090111 A1 | * | 4/2009 | Tomlinson et al. | 60/783 |
| 2009/0260585 A1 | * | 10/2009 | Hack et al. | 122/7 R |
| 2011/0120130 A1 | * | 5/2011 | Mishima et al. | 60/660 |
| 2011/0131993 A1 | * | 6/2011 | Schule et al. | 60/645 |
| 2012/0117969 A1 | * | 5/2012 | Neumann et al. | 60/652 |

FOREIGN PATENT DOCUMENTS

| | | | |
|---|---|---|---|
| DE | 4022544 A1 | | 1/1992 |
| EP | 2333254 A1 | | 6/2011 |
| EP | 2354474 A1 | * | 8/2011 |
| FR | 1245852 A | | 11/1960 |
| WO | WO 2010097203 A2 | * | 9/2010 |

\* cited by examiner

STEAM POWER PLANT WITH HEAT RESERVOIR AND METHOD FOR OPERATING A STEAM POWER PLANT

CROSS REFERENCE TO RELATED APPLICATIONS

This application claims the benefit of European Patent Application No.: 11187644.7, filed on Nov. 3, 2011, which is incorporated herein by reference in its entirety.

SPECIFICATION

Conventional steam power plant plants have a closed water-steam cycle. In the steam generator so much energy is added to the boiler feed water by combustion of a fossil fuel that it passes into the vaporous aggregate condition. This steam drives a generator via one or several steam turbines and afterwards is liquefied again in a condenser.

As it is not possible to economically store electric energy in big scope, there were already considerations in the past aiming at storing thermal energy in a steam power plant in order to thereby increase the flexibility for adaption to grid requirements (peak load).

It is known from U.S. Pat. No. 4,003,786 to arrange a chain of heat exchangers parallel to the preheater passage of the steam power plant. Via these heat exchangers it is possible to exchange heat between a part of the condensate stream and a thermo-oil. This means that the heat exchangers are streamed through by condensate on the one hand and a thermo-oil on the other hand. Thus it is possible to confer heat from the condensate to the thermo-oil in times of low demand and to store this heated thermo-oil. When subsequently a high output is requested, it is possible to re-confer the heat stored in the thermo-oil to the condensate via the same heat exchangers and thus to reduce the demand of tapping steam for preheating the condensate. Consequently, the output available at the generator is increased and the demanded peak load can be met in a better way.

This known arrangement is very complex and requires a multitude of heat exchangers as well as two heat reservoirs that are operated at different temperatures, i.e. approximately 190° C. and 520° C.

From EP 2 333 254 A1 a steam power plant with a heat reservoir is known. This heat reservoir is loaded with feed water that is tapped from the condensate line upstream of the feed water container.

It is the object of the invention to provide a steam power plant which can provide peak load stream and control energy, wherein the apparative effort required therefore is low. Further on it should be possible to control the electric output within a wide range. Furthermore the retrofit of already existing steam power plants has to be possible in a preferably simple manner and with small manipulations of the steam power plant process.

DISCLOSURE OF THE INVENTION

According to the invention this object is solved by means of a steam power plant comprising the features of claims 1 and 14.

The main advantages achieved by the claimed invention are that the electric output of the power plant is reduced during times with high net load by means of regenerative energies (especially wind and sun), regulating energy is provided and generated, overload capacities are provided and the load curve (balancing of minimums and peaks) is smoothed.

The heat exchanger may use steam with a saturated steam temperature higher than the operational temperature of the heat feed water container. Consequently the hot feed water extracted from the heat reservoir significantly reduces the steam consumption not only of the low-pressure preheaters but also of the preheater in the feed water container. Consequently after a very short time a very high electric output is at disposal. This electric output may even exceed the regular maximum electric output of the power plant. In some cases a plus 10% of electric output could be achieved.

The design of the claimed invention is rather simple and easy to control. It is also suitable as a retrofit solution for existing power plants.

A further advantage of the claimed invention is that the electric output can be reduced to a rather great extent.

As with the steam power plant according to the invention the sensitive heat remains in the condensate and the condensate is temporarily stored in the heat reservoir, the apparative effort is low and the heat losses caused by the temporary storage of the condensate are also very low.

A further advantage of the steam power plant according to the invention is to be seen in that it is also possible to provide control energy by means of the heat reservoir, i.e. by either storing heat in the heat reservoir at short notice corresponding to the present demand or taking it from the heat reservoir.

A further advantage is to be seen in that the steam generator can be operated on a higher partial load level in weak load times and thus with an improved degree of efficiency.

A further very important advantage is to be seen in that even already existing steam power plants can generally be strengthened into a steam power plant according to the invention by integrating a heat reservoir, so that the advantages according to the invention can also be realized in already existing installations.

In further advantageous embodiment of the invention it is provided that a "cold" connection of the heat reservoir is connected with a section of the condensate line extending upstream of the at least one low pressure preheater.

In an analogue manner a "warm" connection of the heat reservoir is connected with a section of the condensate line extending downstream of the at least one preheater.

As a connection of the heat reservoir, i.e. the cold connection, is connected with the condensate line upstream of the preheater(s) and the "warm" connection of the heat reservoir is connected with the section of the condensate line extending downstream of the preheater(s), the cold or warm condensate can easily be branched off from the condensate line and re-fed at the suitable place. It is also possible, according to the requirement profile of the heat reservoirs, to alternatively optimally control the temperature level of the tapping steam parallel to a preheater, two preheaters or several preheaters corresponding to the disposability at the turbine.

The connection of the heat reservoir according to the invention preferably takes place via a connecting line, wherein in a first section of the connecting line a pump, preferably a speed-regulated, pump is provided. Alternatively or additionally also in the second section of the connecting line a pump, preferably a speed-regulated pump, can be provided. However, use of pumps can/must not be necessary. Pumps can generally be necessary when discharging (hot/cold) the stored condensate in order to convey against existing system pressure. The furnishing of the heat reservoirs takes place via a bypass arranged control valves. The conveyance takes place via existing main condensate pumps.

By means of the at least one pump and the at least one control valve it is possible to exactly control the condensate stream which is branched off from the main condensate line and conveyed into the heat reservoir respectively the quantity of the condensate stream re-fed into the condensate line from the heat reservoir and thus achieve an optimal controllability of the power plant according to the invention. Usually the first section of the connecting line, which connects the condensate line with the cold connection of the heat reservoir, and the second section of the connection line, which connects the warm connection of the heat reservoir with the condensate line, will be constructed symmetrically. Of course non-return valves, shutoff devices etc. can be provided when required and in dependence.

Of course it is also possible, to some extent as emergency option, to provide a choke valve parallel to the control valve, so that in case of breakdown or maintenance of the control valve the operation of the power plant, even with somewhat reduced control quality, can continue without disturbances.

Basically it is possible to construct the pressure reservoir in such a way concerning its pressure resistance that it withstands the pressure given in the condensate lines. Such a reservoir is usually constructed as mere displacement reservoir being 100% filled with condensate. However, from an operational point of view this often is not optimal. For this reason, a heat reservoir being filled with condensate up to only approximately 90% can be used. The remaining 10% are filled up by means of a steam bolster. Wherein control and choke valves have the task of maintaining the mass streams simultaneously supplied and discharged, overlapped by the heat reservoir level to be maintained.

In further advantageous embodiment of the invention it is provided that the steam power plant has several preheaters being connected in series, especially several low-pressure preheaters, and that the heat reservoir is arranged respectively connected parallel to the one or several of the preheaters. By means of the flexible connection of the heat reservoir either parallel to one, two or a different number of preheaters, the storage capacity of the heat reservoir can be adapted to the requirements and systematically more or less tapping steam from the high-pressure part, the medium-pressure part or the low-pressure part of the steam turbine can be provided for preheating the condensate. Thus a further degree of freedom for optimising the operation of the steam power plant is given.

The above-mentioned object is also solved by a method for operating a steam power plant according to independent claim 9. Wherein the advantages according to the invention, as explained in connection with claims 1 to 8, are realized.

Further advantages and advantageous embodiments of the invention can be taken from the following drawing, its specification and the patent claims. All features described in the drawing, its specification and the patent claims can be relevant for the invention either taken by themselves or in optional combination with each other.

FIGURES

SPECIFICATION OF THE EMBODIMENTS

Figure 1:
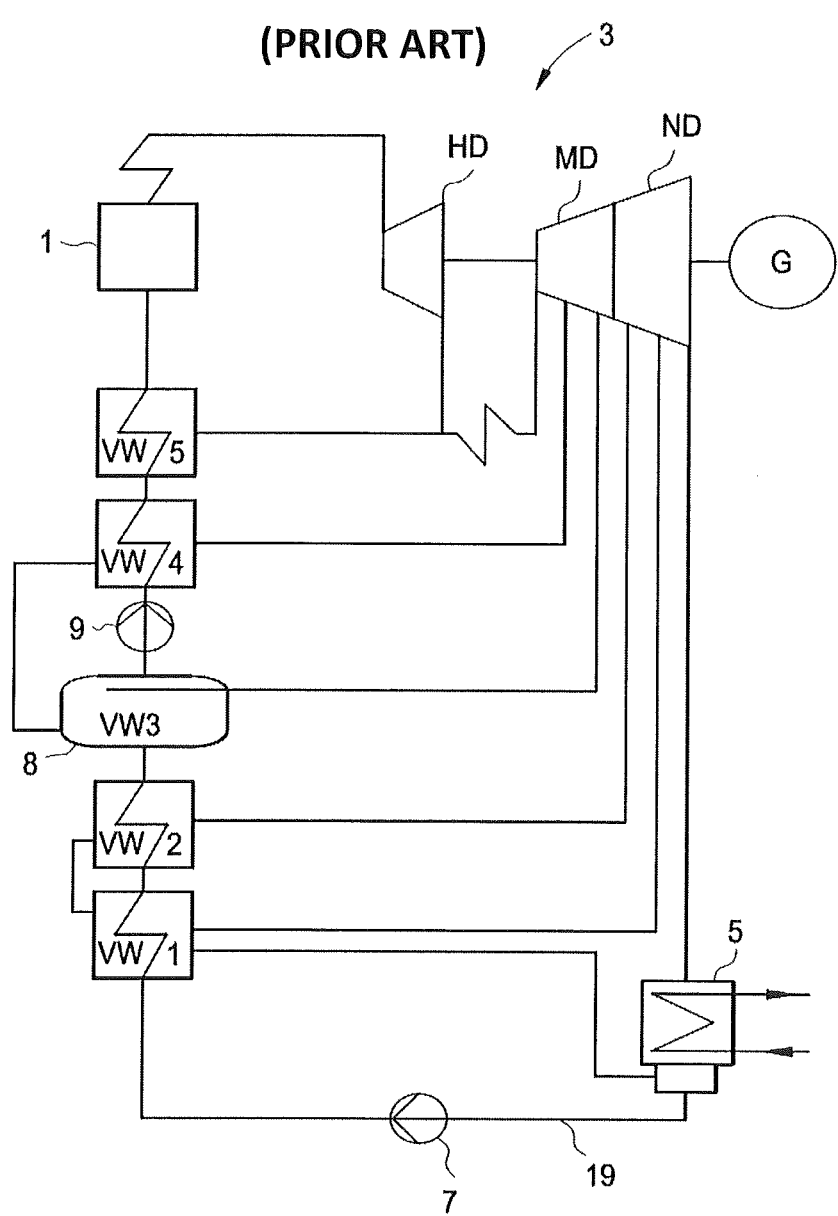
FIG. 1 depicts a diagram of a conventional steam power plant.

In FIG. 1 a steam power plant fuelled with fossils or biomass is represented as block diagram. FIG. 1 essentially has the purpose of designating the single components of the power plant and to represent the water-steam-cycle in its entirety. For reasons of clarity in the following figures only those parts of the water-steam-cycle are represented which are essential to the invention.

In a steam generator 1 under utilization of fossil fuels or by means of biomass out of the feed water live steam is generated, which is expanded in a steam turbine 3 and thus drives a generator G. Turbine 3 can be separated into a high-pressure part HD, a medium-pressure part MD and a low-pressure part ND.

After expanding the steam in turbine 3, it streams into a condenser 5 and is liquefied there. For this purpose a generally liquid cooling medium, as e.g. cooling water, is supplied to condenser 5. This cooling water is then cooled in a cooling tower (not shown) or by a river in the vicinity of the power plant (not shown), before it enters into condenser 5.

The condensate originated in condenser 5 is then supplied, by a condensate pump 7, to several preheaters $VW_i$, with i= 1 ... n. In the shown embodiment behind the second preheater VW2 a feed water container 8 is arranged. Behind the feed water container 8 a feed water pump 9 is provided.

In combination with the invention it is of significance that the condensate from condenser 5 is preheated with steam beginning with the first preheater VW1 until the last preheater VW5. This so-called tapping steam is taken from turbine 3 and leads to a diminution of the output of turbine 3. With the heat exchange between tapping steam and condensate the temperature of the condensate increases from preheater to preheater. Consequently the temperature as well of the steam utilized for preheating must increase from preheater to preheater.

In the shown embodiment the preheaters VW1 and VW2 are heated with steam from low-pressure part ND of steam turbine 3, whereas the last preheater VW5 is partially heated with steam from high-pressure part HD of steam turbine 3. The third preheater VW3 arranged in the feed water container 8 is heated with steam from medium-pressure part MD of turbine 3.

In FIGS. 2 to 5 various operation conditions of a steam power plant according to the invention are shown. As the invention essentially is concerned with the section of the steam power plant between condenser 5 and the feed water container 8, only this part of the steam power plant is shown in FIGS. 2 through 5. Neither are, for reasons of clarity, all fittings and components in FIGS. 2 through 5 designated with reference numerals. The designation of the fittings and representation of the fittings and components corresponds to DIN 2482 "Graphic symbols for heat diagrams", which herewith is referred to, and are thus self-explanatory. Where obviously identical connections are present several times, partially the insertion of reference numerals is dispensed with in order to maintain the clarity of the figures.

Concerning the parts of the steam power process that are not represented FIG. 1 is referred to. Identical components are designated with identical reference numerals and what is mentioned concerning the other figures correspondingly applies.

In a first section 19.1 of the condensate line 19, a condensate pump 7, a cold water connection 101 and a valve V9 are arranged.

Downstream of the last low-pressure preheater VW2 and upstream of the feed water container 8 a valve V10 and a primary hot water connection 102 are provided.

At the cold water connection 101 a first section 21.1 of a connecting line 21 branches off. The first section 21.1 of the connecting line 21 comprises a valve V1 and is connected with a cold connection 23 of a heat reservoir A.

The heat reservoir A is preferably designed as cylindrical, upright heat reservoir and always filled with condensate (constant reservoir volume). Depending on the operating condition of the heat reservoir installation hot and/or cold condensate is stored in the reservoir. At the upper end (c. f. reference number 27) of the heat reservoir A hot condensate streams in and out and at its bottom (c. f. reference number 23) cold condensate. The filling degree of the heat reservoir A is approximately 90%. Between hot and cold condensate a separating layer exists, occurring due to the density-differences between hot and cold condensate. The temperature-layering in the reservoir is important for the function and efficiency of the heat reservoir installation. Insofar besides adequate loading and unloading devices and corresponding insulation above all the constructive design of the reservoir is to be taken into consideration.

With given volume a-heat reservoirs with a great height and consequently a small basis area small surface are preferred, in order to minimize the energy loss by mixing cold and warm condensate inside the heat reservoir. Besides these positive thermodynamic effects as further advantage a low ground requirement is to be noted. The loading condition of the reservoir is determined via temperature measurements being arranged intermittently in the vertical at the heat reservoir casing.

A second section 21.2 of the connecting line connects the cold connection 23 of heat reservoir A with the second part 19.2 of the condensate line 19 at the primary hot water connection 102. The second section 21.2 of the connecting line 21 comprises a pump C. Upstream of the pump C a valve V2 is provided. Downstream of the pump C valve V3 and V4 are provided.

Between the Valve V3 and V4 a second hot water connection 103 is provided. The second hot water connection 103 and a warm connection 27 of heat reservoir A are connected by means of a hot water conduit 29.

In the hot water conduit 29 a valve V5, a heat exchanger B and a valve V6 are installed. The heat exchanger B may be a condensation-heat exchanger with desuperheater and subcooler.

Around the heat exchanger B a bypass D comprising a valve V7 is installed.

The heat exchanger B is supplied with steam from the steam generator 1, especially superheated steam at an appropriate level of temperature and pressure, tapping steam that is tapped from the turbine 3 for example between the high-pressure part HD and the medium-pressure part MD of the turbine. Also auxiliary steam from other sources may be used.

The optimal tapping point depends among other form the temperature of the feed water inside the heat reservoir A when loaded.

The heating steam is connected to the desuperheater of the first heat exchanger B. The condensate of the heating steam is tapped from the desuperheater and at an adequate location (temperature) re-fed into the water-steam-cycle. The condensate can also be discharged into the condenser 5. A valve V8 is arranged in the condensate discharge. A pump (not shown) can also be situated in the condensate discharge.

Figure 2:
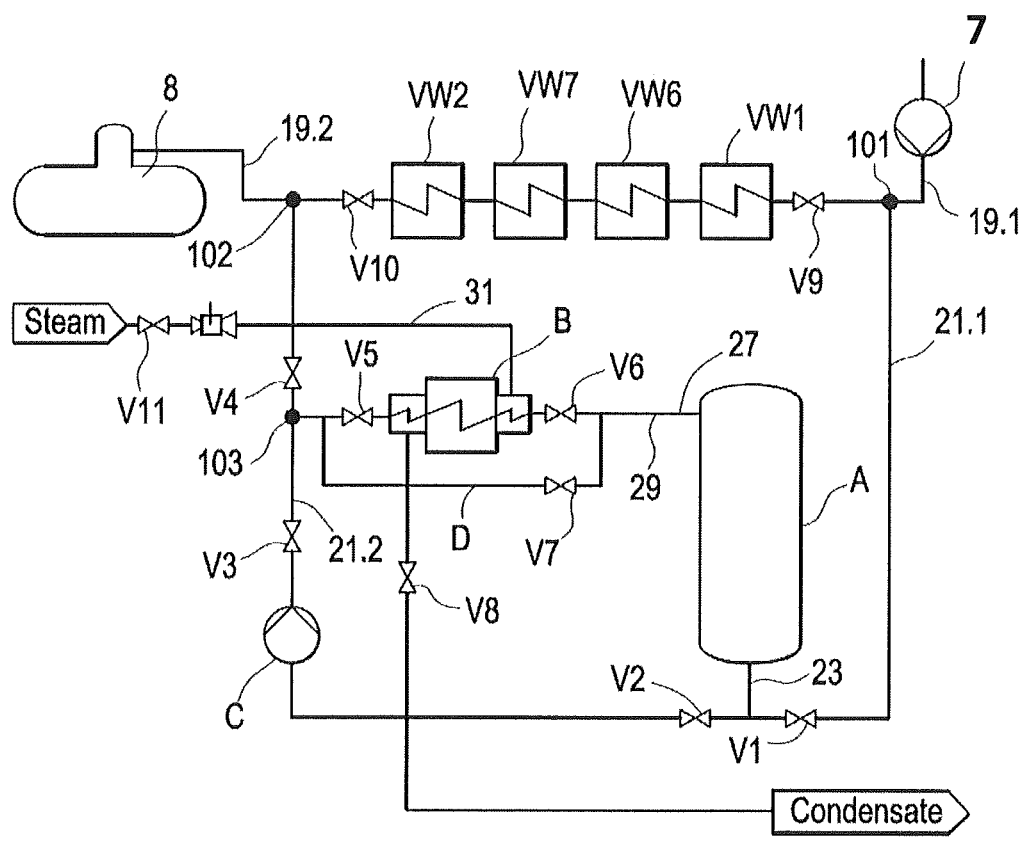
FIG. 2 is an embodiment of a steam power plant according to the invention.

The valves required by the process have a reference numeral beginning with "V" as an abbreviation for "Valve" and a number. An open valve is shown as a contour, whereas a closed valve is shown as a black area inside the contour. In FIG. 2 all valves are shown open.

Figure 3:
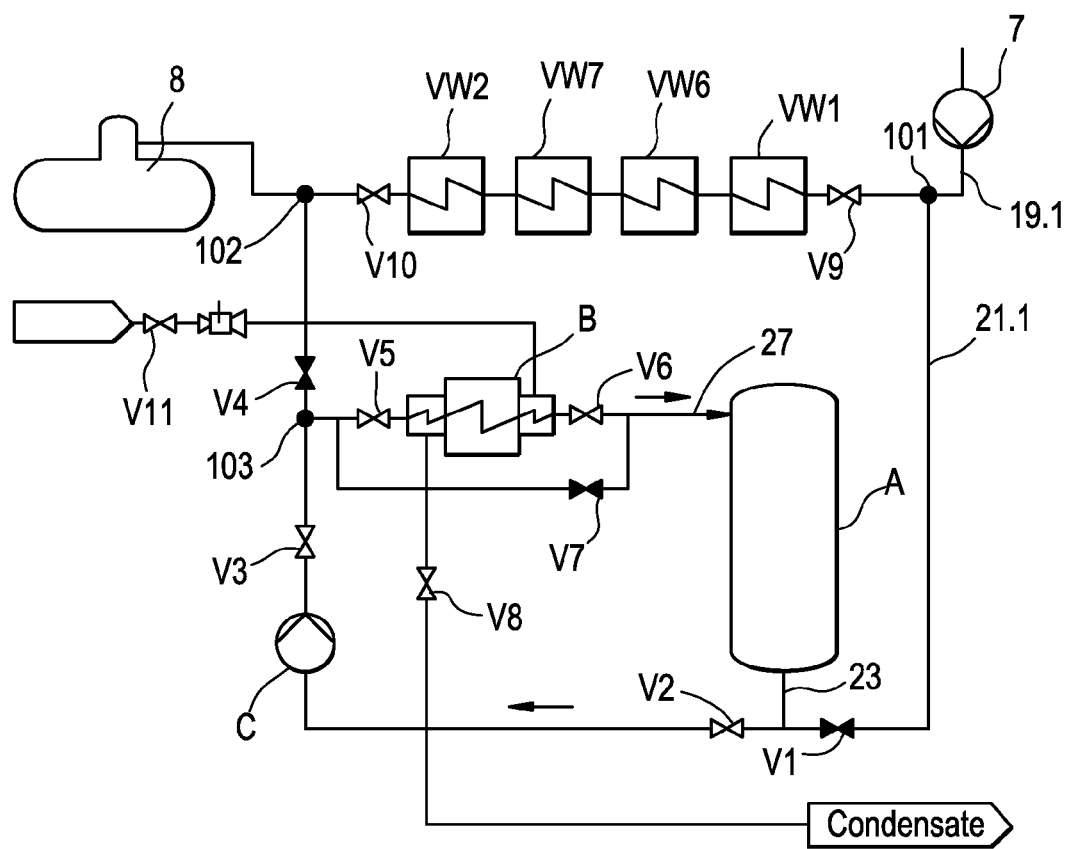
FIG. 3 depicts the steam power plant of FIG. 2 in a first mode of loading.

In FIG. 3 a first mode of loading the heat reservoir A is illustrated. It is assumed that the heat reservoir A is filled with cold water of approx. 30° C.

The valves V2, V3, V5, V6, V8, V9, V10, and V11 are open.

The valves V1, V4 and V7 are closed and the pump C is in operation.

The pump C sucks relatively cold condensate (temperature about 30° C.) out of the cold connection 23 of the heat reservoir A and conveys it in the direction of the arrow into the second section 19.2 of condensate line 19, through the secondary hot water connection 103 the hot water conduit 29, the heat exchanger B to the warm connection 27 of the heat reservoir A. In the heat exchanger the temperature of the feed water is raised to an appropriate level of about 180° C. The maximum temperature of the water inside the heat reservoir A may be equal or slightly higher than the temperature of the feed water container 8.

Since no feed water is added or extracted the level of the feed water in the heat reservoir A remains constant.

When loading heat reservoir A a part of the steam produced by the steam generator 1 does not pass the turbine 3 and consequently the electric output of the steam power plant decreases. This means that by loading heat reservoir A the electric output of the steam power plant can systematically and very quickly be reduced, without restricting or adapting the output of the steam generator 1.

Figure 4:
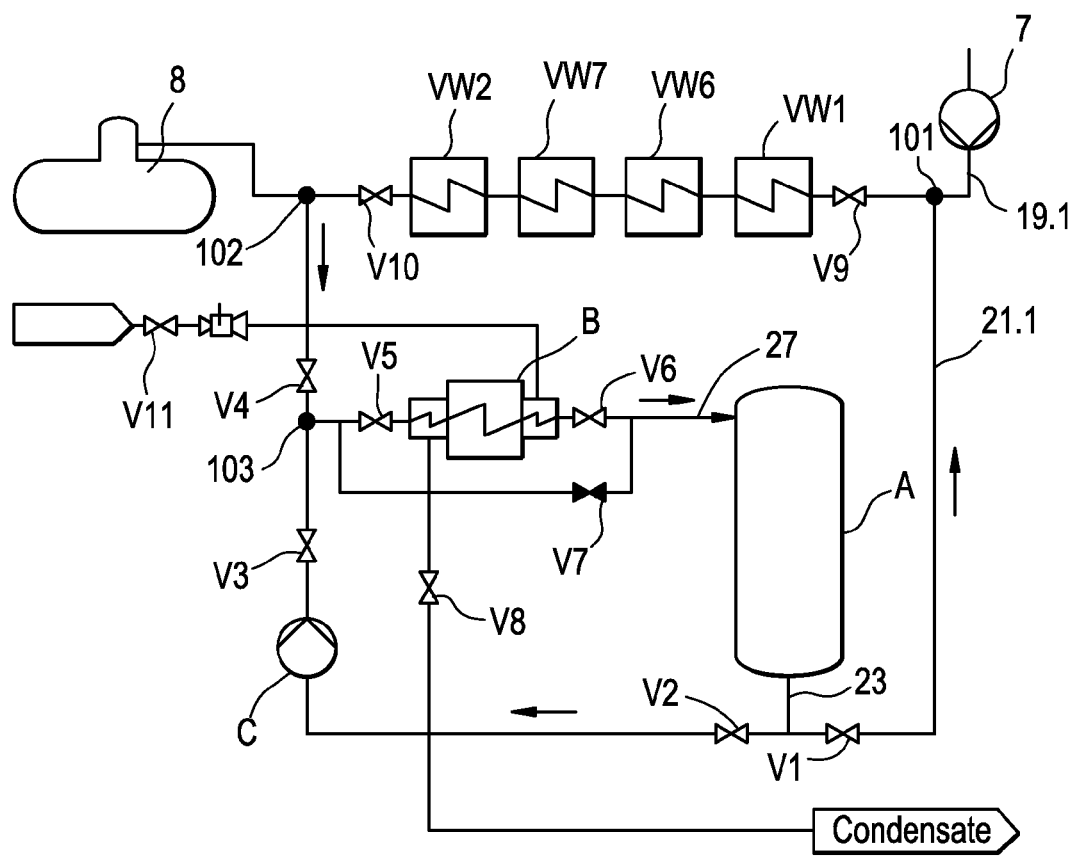
FIG. 4 depicts the steam power plant of FIG. 1 in a second mode of loading.

In FIG. 4 a second mode of loading the heat reservoir A is illustrated.

The valves V1, V2, V3, V4, V5, V6, V8 V9, V10 and V11 are open. Only valve V7 is closed and the pump C is in operation.

It is assumed that the heat reservoir A is filled with cold water of approx. 30° C. and the mass flows through the low-pressure preheaters VW1, VWA, VWB and VW2 are at maximum.

The steam turbine 3 does not operate at full load so that a part of the feed water can be fed into the heat reservoir A along with some feed water extracted from the heat reservoir at 23.

To make sure that the level of the feed water inside the heat reservoir A remains constant the valve V1 is at least partially open so that some cold feed water from the heat reservoir A streams to the cold water connection 101 and subsequently through the preheaters VW1 to VW2.

This allows a further reduction of the electric output at the Generator G without changing the steam output of the steam generator 1.

Figure 5:
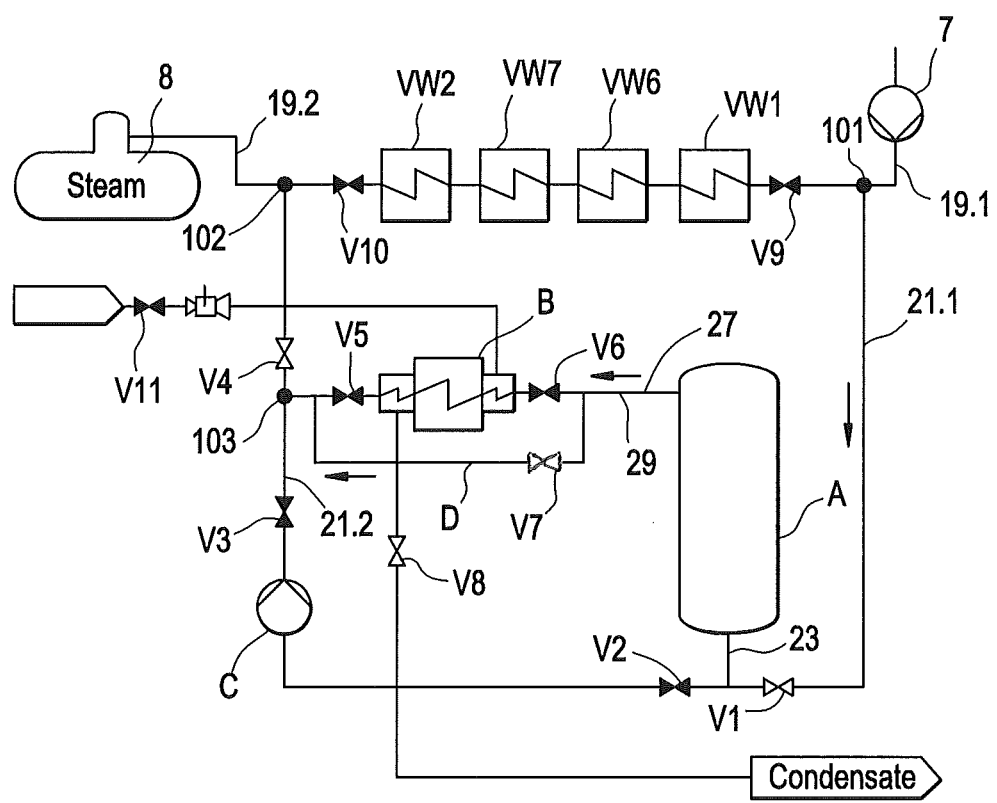
FIG. 5 depicts the steam power plant of FIG. 1 during unloading of the heat reservoir.

In FIG. 5 the unloading is illustrated. The valves V1, V4 and V7 are open. The valves V2, V3, V5, V6, V9, V10 and V11 are closed and the pump C is out of operation.

With this constellation of open and closed valves no feed water streams through the preheaters VW1 to VW2 but the condensate pump 7 conveys feed water from the condenser 5 via the first section 21.1 to the cold connection 23 of the heat reservoir A. This cold feed water pushes hot fed water out of the heat reservoir at the warm connection 27 and via the bypass D to the primary hot water connection 102 and into the feed water container 8. Since the low-pressure preheaters VW1 to VW2 are out of operation they do not consume any tapping steam and consequently the electric output of the generator G is raised.

Unloading is also possible if a part of the cold feed water flows through the preheaters and an other part of the cold fed water feed water flows through the heat exchanger B.

Since the hot feed water extracted from the heat reservoir A has approximately the same temperature than the feed water container 8 the steam consumption of the preheater VW3 inside the feed water container 8 is reduced to nearly zero. This induces a further raise of the electric output.

The heat reservoir A is constructed as displacement reservoir. That means that it is completely filled with liquid condensate. Cold condensate is located in the lower part of heat reservoir A and the preheated condensate is located in the upper part of heat reservoir A.

It is to be understood that—although this is not explicitly shown in the drawings—it is possible to add low pressure condensers at suitable locations within the arrangement for the connection with district heating means and/or for obtaining process steam.

The invention claimed is:

1. A steam power plant comprising:
   a steam generator;
   a low-pressure turbine receiving steam from the steam generator to drive the turbine;
   a condenser to condense steam received from the low-pressure turbine to provide a condensate;
   at least one low-pressure preheater receiving the condensate from the condenser via a condensate line to heat the condensate by steam from the low pressure turbine;
   a heat reservoir receiving the condensate from the condenser to store the condensate, wherein the heat reservoir is fluidly arranged in parallel to the at least one low-pressure preheater;
   a feed water container receiving the condensate from the at least one low-pressure preheater via the condensate line and the heat reservoir; and
   a heat exchanger fluidly arranged to receive the condensate from at least one of the heat reservoir, the at least one low-pressure turbine and the feed water container to heat the condensate to provide heated condensate to the heat reservoir, wherein the heat exchanger uses heated fluid to heat the condensate and wherein the heat exchanger is fluidly arranged in parallel to the at least one low-pressure preheater, and
   wherein the lower portion of the heat reservoir is fluidly connected to the heat exchanger, fluidly connected to the low-pressure preheater, and fluidly connected to the feed water container.

2. The steam power plant according to claim 1, wherein the heat exchanger uses steam from the turbine, steam from the steam generator, or auxiliary steam for heating the condensate.

3. The steam power plant according to the claim 1, wherein the condenser is fluidly connected to the lower portion of the heat reservoir.

4. The steam power plant according to claim 1, wherein the upper portion of the heat reservoir is fluidly connected to the heat exchanger.

5. The steam power plant according to claim 1, wherein the heat exchanger is supplied with the steam by a steam supply line.

6. The steam power plant according to claim 1, further comprising a bypass installed fluidly in parallel to the heat exchanger.

7. The steam power plant according to claim 1, flintier comprising valves to control the fluid flow between the condenser and the low-pressure preheater, between the condenser and the heat reservoir, between the heat reservoir and the heat exchanger, between the heat exchanger and the feed water container.

8. The steam power plant according to claim 7, wherein the valves include control valves, shutoff devices and/or choke valves.

9. The steam power plant according to claim 1, wherein the at least one low-pressure preheater includes a plurality of low-pressure preheaters connected fluidly in series, wherein the heat reservoir is fluidly connected in parallel to one or more of the low-pressure preheaters.

10. A method for operating a steam power plant, the method comprising:
    condensing steam from a low-pressure turbine upstream of a low-pressure preheater and a heat reservoir to provide a condensate;
    providing the condensate to the low-pressure preheater and the heat reservoir, wherein the heat reservoir is fluidly connected in parallel with the low-pressure preheater;
    selectively providing the condensate from the low-pressure preheater and the heat reservoir to a feed water container; and
    selectively heating, with a heat exchanger using a heated fluid, the condensate provided from at least one of the heat reservoir, the at least one low pressure turbine and the feed water container to provide heated condensate;
    providing the heated condensate to the heat reservoir, wherein the heat exchanger is fluidly connected in parallel with the low-pressure preheater, bypassing the heat exchanger when providing the condensate from the heat reservoir to the feed water container;
    blocking the condensate from passing through the at least one low-pressure preheater;
    discharging the heat reservoir by extracting the heated condensate from the heat reservoir and supplying it downstream of the least one low-pressure preheater bypassing or passing through the heat exchanger; and
    providing the condensate from upstream of the at east one low-pressure to the heat reservoir.

11. The method according to claim 10, further comprising:
    providing preheated condensate downstream of the at least one low-pressure preheater to the heat reservoir through the heat exchanger and recycling the condensate from the heat reservoir back through the heat exchanger.

12. A method for operating a steam power plant, the method comprising:
    condensing a steam from a low-pressure turbine upstream of a low-pressure preheater and a heat reservoir to provide a condensate;
    providing the condensate to the low-pressure preheater and the heat reservoir, wherein the heat reservoir is fluidly connected in parallel with the low-pressure preheater;
    selectively providing the condensate from the low-pressure preheater and the heat reservoir to a feed water container; and
    selectively heating, with a heat exchanger using a heated fluid, the condensate provided from at least one of the heat reservoir, the at least one low pressure turbine and the feed water container to provide heated condensate;
    providing the heated condensate to the heat reservoir, wherein the heat exchanger is fluidly connected in parallel with the low-pressure preheater, bypassing the heat exchanger when providing the condensate from the heat reservoir to the feed water container;
    discharging the heat reservoir by extracting the heated condensate from the heat reservoir and supplying it downstream of the least one low-pressure preheater bypassing the heat exchanger.

13. The method according to claim 10, further comprising providing the condensate through the at least one low-pressure preheater to the feed water container and circulating the condensate between the heat exchanger and the heat reservoir wherein the exchanger heats the circulating condensate by the heated condensate.

14. A method for operating a steam power plant, the method comprising:
condensing steam from a low-pressure turbine upstream of a low-pressure preheater and a heat reservoir to provide a condensate;
providing the condensate to the low-pressure preheater and the heat reservoir, wherein the heat reservoir is fluidly connected in parallel with the low-pressure preheater;
selectively providing the condensate from the low-pressure preheater and the heat reservoir to a feed water container; and
selectively heating with a heat exchanger using a heated fluid, the condensate provided from at least one of the heat reservoir, the at least one low pressure turbine and the feed water container to provide heated condensate;
providing the heated condensate to the heat reservoir, wherein the heat exchanger is fluidly connected in parallel with the low-pressure preheater, bypassing the heat exchanger when providing the condensate from the heat reservoir to the feed water container;
discharging the heat reservoir by extracting the heated condensate from the heat reservoir and supplying it downstream of the least one low-pressure preheater through the heat exchanger.

15. The method according to claim 10, further comprising circulating the condensate between the heat exchanger and the heat reservoir wherein the exchanger heats the circulating condensate by the heated condensate.

16. The method according to claim 15, further comprising selectively blocking the condensate downstream of the low-pressure preheater from fluidly communicating with the heat reservoir or fully communicating with the heat reservoir.

17. The method according to claim 10, further comprising fluidly communicating the condensate of the heat reservoir upstream of the low-pressure preheater when the condensate downstream of the low-pressure preheater is fluidly communicating with the heat reservoir.

18. The method according to claim 10, wherein the providing the condensate form upstream of the at least one low-pressure preheater to the heat reservoir includes providing the condensate from upstream of the at least one low-pressure preheater to a lower portion of the heat reservoir; and
wherein the selectively heating, with a heat exchanger using, a heated fluid, the condensate provided from at least one of the heat reservoir, the at least one low-pressure turbine and the feed water container includes providing such condensate to the upper portion of the heat reservoir.

19. The method according to claim 18, wherein the temperature of the condensate of the upper layer is approximately equal to or greater than the temperature of the condensate in the feed water container.

20. The method according to claim 10, wherein the heated fluid is steam.

21. The steam power plant according to claim 1, wherein the condenser is fluidly connected to the lower portion of the heat reservoir, and the upper portion of the heat reservoir is fluidly connected to the heat exchanger, wherein the heat reservoir is configured to provide an upper layer of heated condensate and a lower layer of condensate cooler than the upper layer.

* * * * *